No. 789,187. PATENTED MAY 9, 1905.
T. TAILLEFER.
BUTTER CUTTING AND MEASURING IMPLEMENT.
APPLICATION FILED DEC. 31, 1904.
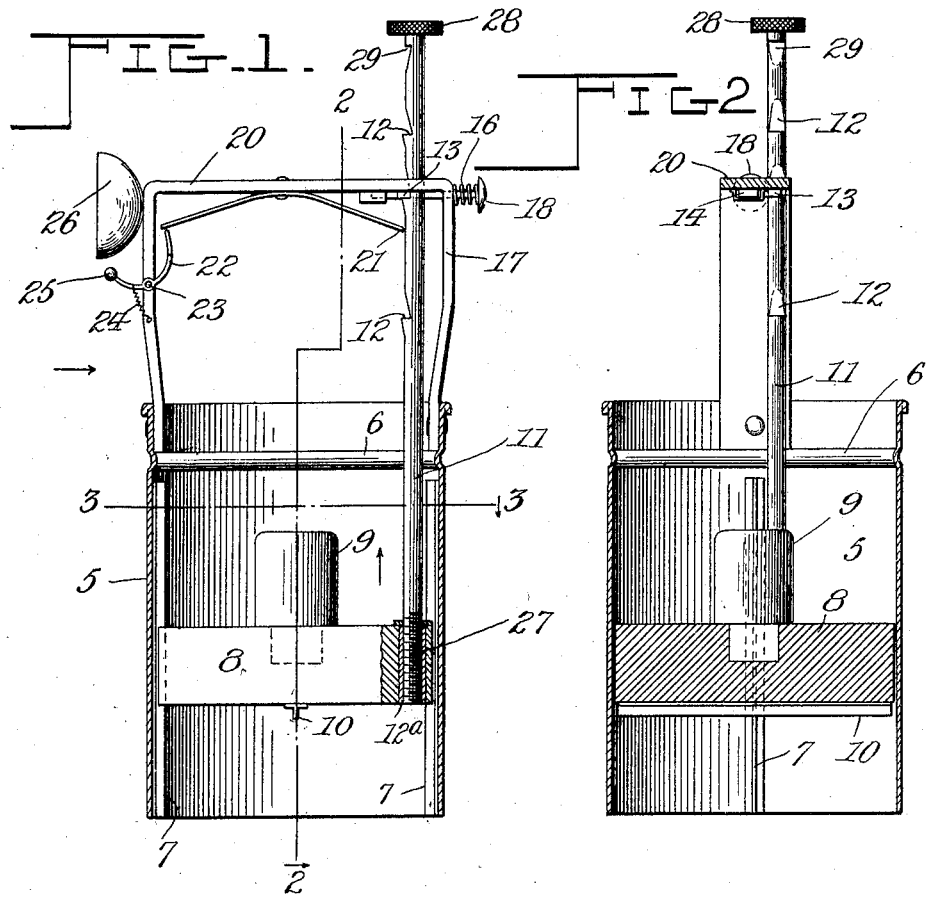
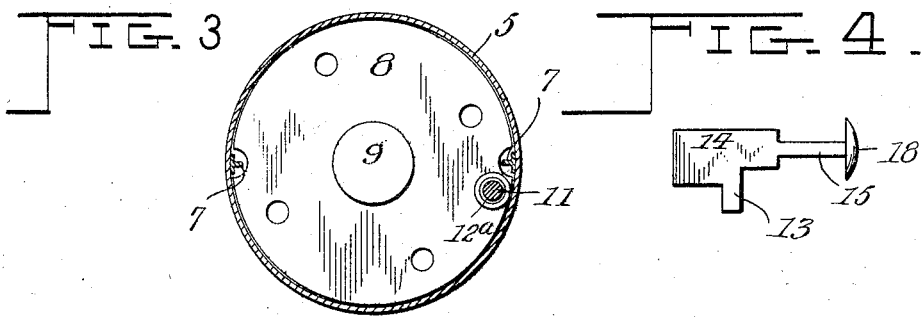
Witnesses:
Theophile Taillefer, Inventor,
By Frederick H. Gibbs
Attorney No. 789,187. Patented May 9, 1905.

UNITED STATES PATENT OFFICE.

THEOPHILE TAILLEFER, OF MONTREAL, CANADA, ASSIGNOR OF ONE-HALF TO MAGZIL COUSINEAU, OF MONTREAL, CANADA.

BUTTER CUTTING AND MEASURING IMPLEMENT.

SPECIFICATION forming part of Letters Patent No. 789,187, dated May 9, 1905.

Application filed December 31, 1904. Serial No. 239,247.

*To all whom it may concern:*

Be it known that I, THEOPHILE TAILLEFER, a subject of the King of Great Britain, residing in the city and district of Montreal, in the Province of Quebec, Canada, have invented certain new and useful Improvements in Butter Cutting and Measuring Implements; and I do hereby declare that the following is a full, clear, and exact description of the invention, such as will enable others skilled in the art to which it appertains to make and use the same.

This invention relates to new and useful improvements in butter cutting and measuring implements; and it consists in certain features of novelty in the detail construction and arrangement thereof, all as hereinafter more fully described, and specifically pointed out in the claims.

The object of the invention is to provide a simple, compact, and durable implement which may be used for cutting from a package predetermined quantities of butter—as, for example, a quarter-pound, a half-pound, and a full pound, or any fractional part of a pound or multiple thereof—and comprises a casing with a reciprocatory plunger therein with blades projecting radially inwardly from the casing and, if need be, vertically from the plunger to engage with the butter and assist in breaking it off.

It also comprises a handle and means movable with the plunger for regulating the position of the plunger within the casing.

Referring to the annexed drawings, in which similar numerals of reference indicate corresponding parts in all the views, Figure 1 is a vertical sectional view taken approximately centrally of the device. Fig. 2 is a vertical sectional view taken approximately centrally of the device on the line 2 2 of Fig. 1. Fig. 3 is a transverse sectional view taken on line 3 3 of Fig. 1, and Fig. 4 is a detached detail view of the locking-catch hereinafter referred to.

Referring to the parts, 5 is a casing, preferably tubular in form, which is provided with an inwardly-projecting bead 6. The casing is also provided with longitudinally-extending knives 7, which knives project radially inwardly from the casing, as shown in the drawings, while a plunger 8 with a handle 9 is mounted in the casing, said plunger being reciprocatory longitudinally of said casing.

Upon the plunger 8 is a knife 10, extending diametrically across the casing 5 upon the lower contact-face of said plunger.

A screw-threaded rod 11 is screwed into a suitable socket, as 12ª, in the plunger 8, and said rod 11 rises vertically from said plunger, as shown in Figs. 1 and 2. At proper intervals along the length of said rod 11 notches 12 are provided, with which notches the shoulder 13 of the locking-catch 14 is adapted to engage. Said locking-catch is provided with the shank portion 15, upon which is mounted the spring 16, which spring bears at one end against the handle 17 and at its opposite end against the head 18 upon said shank 15, whereby the shoulder 13 is held normally in position to engage with said notches 12, so that as the plunger rises in the direction indicated by the arrow in Fig. 1 the shoulder 13 will engage the notches 12 to lock the plunger in the desired predetermined position necessary to measure the required quantity of butter.

It will be evident that the locking-catch 14 may be projected inwardly away from the notch 12 to permit the rod 11 and plunger 8 to be withdrawn to a greater or less extent into the casing 5.

Extending transversely across the horizontal portion 20 of the handle is a spring-arm 21, which will engage with the notches 12 aforesaid to carry said spring upwardly away from the plunger, thereby rocking the opposite end of said spring downwardly or toward the plunger and rocking the spring-arm 22 upon its pintle 23 against the stress of the spring 24, so that when the spring-arm 21 is released the hammer 25 will strike the bell 26 and sound the alarm. This alarm is useful when the device is to be used in the dark, as in unlighted cellars and in coolers in which butter may be kept, and will serve as an indicating means to determine when the plunger has reached the desired position.

In operation the device is grasped by the handle portion 20 and is forced into the material to be cut, whether butter or other breakable material, until the portion of the casing below the plunger 8 is filled, after which the device is given a partial rotation while the knives 7 and 10 are engaged with the material to be cut, and it will be found that said knives will engage the butter sufficiently so that it will be broken off in a line parallel with the lower or entering edge of the casing 5, and it has been found in practice that the butter is cleanly severed, and once the proper proportions are established the device may be used for automatically determining any required quantity of butter.

As it is sometimes desirable to weigh the butter in the ordinary wooden butter-plate, which is of light weight, and as it is customary to make the customer pay for the butter-plate when purchasing the butter, the screw-threaded portion 27 is provided, and by means of the burred head 28 the rod 11 may be adjusted so that the notches 12 may be varied in their distance from the plunger 8, thereby regulating to a nicety the adjustment of the space between the contact-face of the plunger 8 and the outer end of the casing 5.

The annular bead 6 serves as a stop to prevent egress of the plunger 8 through the handle end of the casing, and the shoulder 29 serves as a means adapted to contact with the shoulder 13 of the locking-catch to prevent the plunger passing to an extreme position in the opposite direction.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. A butter cutting and measuring device comprising a casing, a reciprocatory plunger therein, a manipulating-handle connected with said casing, knives projecting into said casing, an adjustable rod engaging said plunger, and means for locking said plunger in different positions.

2. In a butter cutting and measuring device, a casing, a reciprocatory plunger therein, a manipulating-handle connected with said casing, locking means on said handle, and a rod connected with said plunger adapted to be engaged by said locking means, and an alarm adapted to be actuated by said rod.

3. In a butter cutting and measuring device, a casing, a reciprocatory plunger movable therein, a blade connected with said plunger, a manipulating-handle, and means for locking said plunger in different predetermined positions.

4. In a butter cutting and measuring device, a casing, a reciprocatory plunger movable therein, a blade connected with said plunger, blades projecting radially inwardly from said casing, means for locking said plunger in different predetermined positions, and a manipulating-handle connected with said casing.

5. In a butter cutting and measuring device, a casing, a reciprocatory plunger therein, a rod connected with said plunger and movable therewith, means for locking said rod, and a blade connected with said plunger.

6. In a butter cutting and measuring device, a casing, a plurality of knives projecting into said casing, a plunger, a rod connected with said plunger, said rod being provided with a plurality of notches, a handle through which said rod passes, and spring-actuated locking means on said handle adapted to engage said notches.

7. In a butter cutting and measuring device, a casing, a plurality of knives projecting into said casing, a reciprocatory, perforated plunger, a rod connected with said plunger, said rod being provided with a plurality of notches, a handle through which said rod passes, and a spring-actuated locking means on said handle adapted to engage said notches.

8. In a butter cutting and measuring device, a casing, a plurality of knives projecting into said casing, a plunger, a rod adjustably connected with said plunger, said rod being provided with a plurality of notches, a handle through which said rod passes, and spring-actuated locking means on said handle adapted to engage said notches.

In witness whereof I have hereunto set my hand in the presence of two witnesses.

THEOPHILE TAILLEFER.

Witnesses:
ALEXANDRE GAILORD,
MAGZIL COUSINEAU.